(12) United States Patent
Marshall

(10) Patent No.: US 11,067,665 B2
(45) Date of Patent: Jul. 20, 2021

(54) AIRCRAFT RADAR ASSEMBLY

(71) Applicant: BAE Systems plc, London (GB)

(72) Inventor: Paul Edward William Marshall, Preston (GB)

(73) Assignee: BAE Systems plc

( * ) Notice: Subject to any disclaimer, the term of this patent is extended or adjusted under 35 U.S.C. 154(b) by 337 days.

(21) Appl. No.: 16/311,393

(22) PCT Filed: Jun. 14, 2017

(86) PCT No.: PCT/GB2017/051736
§ 371 (c)(1),
(2) Date: Dec. 19, 2018

(87) PCT Pub. No.: WO2017/220971
PCT Pub. Date: Dec. 28, 2017

(65) Prior Publication Data
US 2019/0257919 A1   Aug. 22, 2019

(30) Foreign Application Priority Data

Jun. 24, 2016 (EP) .................................... 16275090
Jun. 24, 2016 (GB) .................................... 1611020

(51) Int. Cl.
*G01S 7/03* (2006.01)
*G01S 13/95* (2006.01)
(Continued)

(52) U.S. Cl.
CPC .............. *G01S 7/032* (2013.01); *G01S 13/42* (2013.01); *G01S 13/951* (2013.01);
(Continued)

(58) Field of Classification Search
CPC ...... G01S 13/42; G01S 13/951; G01S 13/953; G01S 7/032; H01Q 1/281; H01Q 1/40;
(Continued)

(56) References Cited

U.S. PATENT DOCUMENTS 3,953,857 A * 4/1976 Jenks ..................... H01Q 1/281
343/705
6,034,643 A    3/2000 Nishikawa
(Continued)

FOREIGN PATENT DOCUMENTS

EP   0479507 A1   4/1992
EP   2887455 A1   6/2015
(Continued)

OTHER PUBLICATIONS

International Search Report and Written Opinion of International Application No. PCT/GB2017/051736, dated Sep. 20, 2017, 12 pages.
(Continued)

*Primary Examiner* — Timothy A Brainard
(74) *Attorney, Agent, or Firm* — Maine Cernota & Rardin

(57) ABSTRACT

An aircraft radar assembly (200) comprising: a radome (202); a radar antenna (100) housed within the radome (202), the radar antenna (100) having a surface for transmitting and/or receiving radar waves; and rotation means (204) configured to rotate the radar antenna (100) within the radome (202) about an axis of rotation (206); wherein the surface is oblique to the axis of rotation (206).

14 Claims, 3 Drawing Sheets

(51) Int. Cl.
*H01Q 1/28* (2006.01)
*H01Q 1/40* (2006.01)
*H01Q 3/04* (2006.01)
*H01Q 25/00* (2006.01)
*G01S 13/42* (2006.01)
*H01Q 21/06* (2006.01)
*H01Q 1/42* (2006.01)

(52) U.S. Cl.
CPC ........... *G01S 13/953* (2013.01); *H01Q 1/281* (2013.01); *H01Q 1/40* (2013.01); *H01Q 1/42* (2013.01); *H01Q 3/04* (2013.01); *H01Q 21/061* (2013.01); *H01Q 25/00* (2013.01); *Y02A 90/10* (2018.01)

(58) Field of Classification Search
CPC ........ H01Q 1/42; H01Q 21/061; H01Q 25/00; H01Q 3/04; Y02A 90/10
See application file for complete search history.

(56) References Cited

U.S. PATENT DOCUMENTS

| | | | |
|---|---|---|---|
| 6,356,239 B1 | 3/2002 | Carson | |
| 7,528,613 B1 * | 5/2009 | Thompson | H01Q 3/06 324/637 |
| 2006/0071867 A1 | 4/2006 | Quagliaro | |
| 2006/0114164 A1 | 6/2006 | Iluz | |
| 2012/0119973 A1 | 5/2012 | Ahring | |
| 2014/0159949 A1 * | 6/2014 | Mialhe | G01S 13/95 342/26 B |

FOREIGN PATENT DOCUMENTS

| | | |
|---|---|---|
| GB | 2253520 A | 9/1992 |
| GB | 2295493 A | 5/1996 |
| WO | 2006057000 A1 | 6/2006 |
| WO | 2015133575 A1 | 4/2017 |

OTHER PUBLICATIONS

International Preliminary Report on Patentability of International Application No. PCT/GB2017/051736, dated Jan. 3, 2019, 7 pages.
Search Report under Section 17(5) of Great Britain Patent Application No. GB1611020.7, dated Nov. 2, 2016, 4 pages.
Extended European Search Report of European Patent Application No. EP16275090-5, dated Dec. 22, 2016, 7 pages.
Combined Search and Examination Report under Sections 17 and 18(3) of Great Britain Patent Application No. GB1709452-5, dated Nov. 28, 2017, 9 pages.

* cited by examiner

AIRCRAFT RADAR ASSEMBLY

RELATED APPLICATIONS

This application is a national phase application filed under 35 USC § 371 of PCT Application No. PCT/GB2017/051736 with an International filing date of Jun. 14, 2017 which claims priority of GB Patent Application 1611020.7 filed Jun. 24, 2016 and EP Patent Application 16275090.5 filed Jun. 24, 2016. Each of these applications is herein incorporated by reference in its entirety for all purposes.

FIELD OF THE INVENTION

The present invention relates to aircraft radar assemblies.

BACKGROUND

Many aircraft comprise radar systems for transmitting and/or receiving radar signals. For example, an aircraft may comprise a weather radar system.

Radar systems are usually installed in a radome on the aircraft. A radome may be located at the nose cone of the aircraft. A radome is a structural enclosure that protects the radar antenna from the surrounding environment and impacts. Radomes are constructed of material that minimally attenuates electromagnetic signals transmitted or received by the enclosed radar antenna.

SUMMARY OF THE INVENTION

In a first aspect, the present invention provides an aircraft radar assembly comprising: a radome; a radar antenna housed within the radome, the radar antenna having a surface for transmitting and/or receiving radar waves; and rotation means configured to rotate the radar antenna within the radome about an axis of rotation. The surface is oblique to the axis of rotation.

The axis of rotation may be parallel to a longitudinal axis of the radome. The axis of rotation may be coincident with a longitudinal axis of the radome. The radar antenna may be elongate in a direction of the axis of rotation. The radar antenna may be elongate in a direction of a longitudinal axis of the radome. The surface may have bilateral symmetry. The axis of rotation may pass through a point along an axis of symmetry of the surface. The surface may be substantially planar, i.e. substantially flat, i.e. not curved. The surface may be hexagonal, or alternatively square, pentagonal, heptagonal, or octagonal.

The radar antenna may comprise a plurality of radar antenna elements disposed on the surface. Each radar antenna element may be configured to perform at least one of: transmit radar waves, and detect radar waves.

A width of at least a portion of the radar antenna may taper in a direction of a longitudinal axis of the radar antenna. The width of the radar antenna may taper outwards in a direction of a longitudinal axis of the radar antenna from a first end of the radar antenna to an intermediate portion of the radar antenna. The width of the radar antenna may taper inwards in a direction of the longitudinal axis of the radar antenna from the intermediate portion of the radar antenna to a second end of the radar antenna, the second end being opposite to the first end.

In a further aspect, the present invention provides an aircraft comprising an aircraft radar assembly according to any preceding aspect. The aircraft radar assembly may be located at a nose of the aircraft.

In a further aspect, the present invention provides a method comprising: providing a radome; locating a radar antenna within the radome, the radar antenna having a surface for transmitting and/or receiving radar waves; and rotating the radar antenna within the radome about an axis of rotation. The surface may be oblique to the axis of rotation.

DETAILED DESCRIPTION

Figure 1:
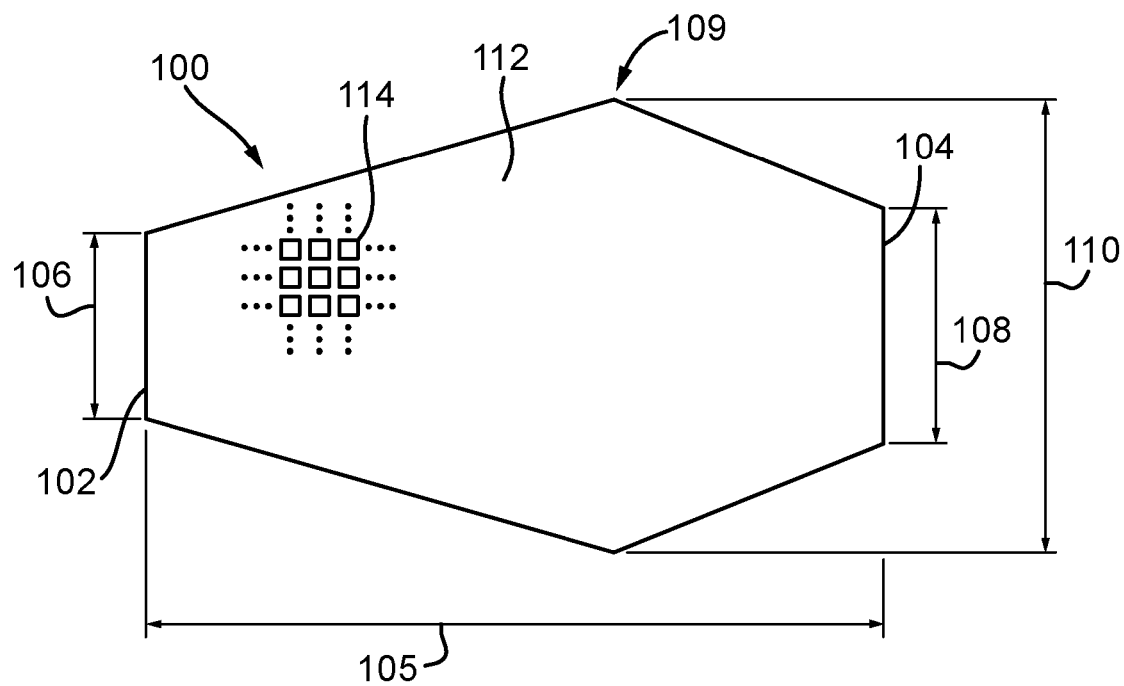
FIG. 1 is a schematic illustration (not to scale) of a top view of a radar antenna.

FIG. 1 is a schematic illustration (not to scale) of a top view of an embodiment of a radar antenna 100.

In this embodiment, when viewed from above as in FIG. 1, the radar antenna 100 has the shape of an elongated hexagon. The radar antenna 100 has a front, first end 102 and a rear, second end 104 opposite to the first end 102. Edges of the radar antenna 100 at the first and second ends 102, 104 are substantially parallel to each other. When viewed from above as in FIG. 1, the radar antenna 100 has bilateral symmetry about an axis of symmetry that extends from the first end 102 to the second end 104 and is substantially perpendicular to the edges of the radar antenna 100 at the first and second ends 102, 104.

In this embodiment, the length of the radar antenna 100 between the first end 102 and the second end 104, which is indicated in FIG. 1 by a double-headed arrow and the reference numeral 105, is 1.3 m.

The width of the radar antenna 100 is the distance between opposite side edges of the radar antenna 100, the side edges extending between the first and second ends 102, 104. The width of the radar antenna 100 tapers outwards from the first end 102 to an intermediate portion 109, and then tapers inwards from the intermediate portion 109 to the second end 104. Thus, the width of the radar antenna 100 is at a maximum at the intermediate potion 109.

In this embodiment, the width of the radar antenna 100 at the first end 102, which is indicated in FIG. 1 by a double-headed arrow and the reference numeral 106, is 0.3 m.

In this embodiment, the width of the radar antenna 100 at the second end 104, which is indicated in FIG. 1 by a double-headed arrow and the reference numeral 108, is 0.8 m.

In this embodiment, the width of the radar antenna 100 at the intermediate portion 109, which is indicated in FIG. 1 by a double-headed arrow and the reference numeral 110, is 0.83 m In this embodiment, the distance, along the length of the radar antenna 100, between the first end 102 and the intermediate portion is greater than the distance between the intermediate portion 109 and the second end 104 along the length of the radar antenna 100. In this embodiment, the distance between the first end 102 and the intermediate portion along the length of the radar antenna 100 is 1.0 m.

In this embodiment, the surface area of the top surface of the radar antenna 100 is approximately 0.81 m². Also, the top surface of the radar antenna 100 is substantially flat or planar.

The radar antenna 100 comprises a support structure 112 and an array of radar antenna elements 114 disposed on the top surface of the support structure 112. Preferably, the array of radar antenna elements 114 covers all of the top surface of the support structure 112. The radar antenna elements 114 are spaced apart from each other on the top surface of the support structure 112. The radar antenna elements 114 are arranged in a grid pattern on the top surface of the support structure 112.

In some embodiments, the support structure 112 is made of aircraft grade metal such as aircraft grade aluminium. The radar antenna elements 114 may include, for example, Gallium Arsenide or Gallium Nitride radar antenna elements.

In this embodiment, the radar antenna elements 114 are configured to transmit radar waves at a predetermined frequency or frequency bandwidth. Control of the radar antenna elements 114 to transmit radar waves may be performed by a controller (not shown in the Figures) operatively coupled to the radar antenna 100.

Also, the radar antenna elements 114 are configured to receive incident radar waves having a predetermined frequency or within a predetermined frequency bandwidth, for example a frequency or frequency range substantially equal to that of a radar wave transmitted by the radar antenna 100. The radar antenna elements 114 are further configured to send a signal corresponding to received radar wave to a signal processor (not shown in the Figures) operatively coupled to the radar antenna 100.

In this embodiment, the radar antenna 100 is an Active Electronically Scanned Array (AESA). The radar antenna elements 114 may be operated as a phased array to provide electronic beam steering.

In some embodiments, the radar antenna elements 114 are tunable such that the wavelength of transmitted and/or received radar waves may be varied.

Figure 2:
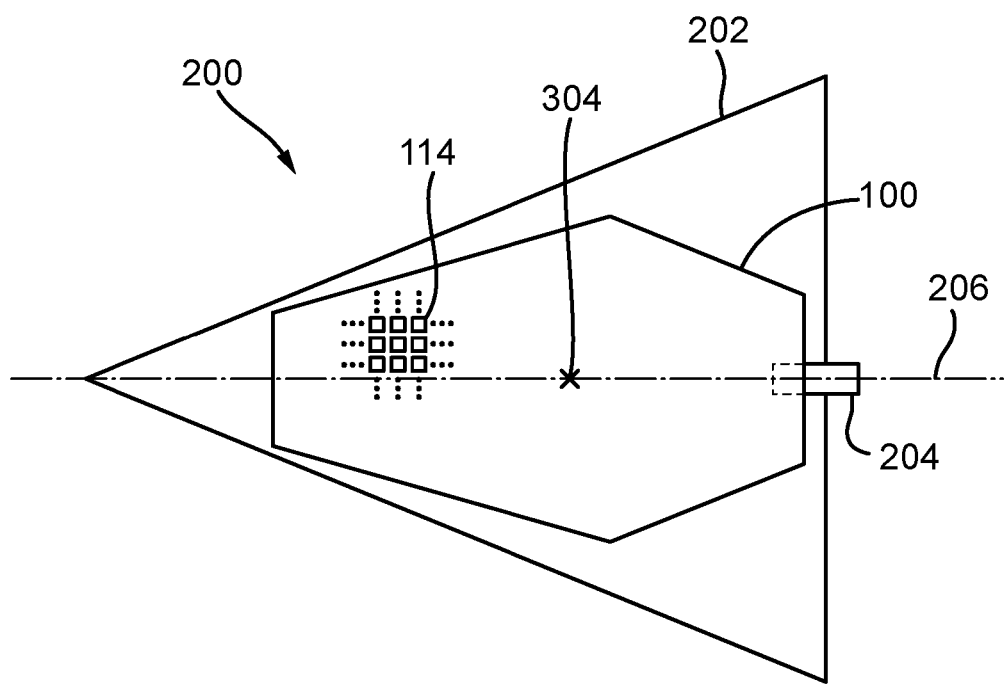
FIG. 2 is a schematic illustration (not to scale) showing a side view cross section of an aircraft nose assembly.

FIG. 2 is a schematic illustration (not to scale) showing a side view cross section of an embodiment of an aircraft nose assembly 200, which comprises the single radar antenna 100. FIG. 2 shows a side aspect of the radar antenna 100.

In this embodiment, the aircraft nose assembly 200 comprises a radome 202, the radar antenna 100, and a rotary actuator 204.

The radome 202 is constructed of an electrically transparent material that minimally attenuates electromagnetic signals transmitted and/or received by the radar antenna 100.

The radar antenna 100 is wholly housed within the radome 202. The radar antenna 100 is coupled to the radome 202 via the rotary actuator 204.

As shown, the rotary actuator 204 is the only provision for moving the radar antenna 100 relative to the radome 202 to substantially alter the direction of the radar antenna 100.

The rotary actuator 204 is coupled to the radar antenna 100 at or proximate to the second end 104, also either to the radome 202 or an aircraft to which the radome 202 is fixed.

The rotary actuator 204 is configured to rotate the radar antenna 100 within the radome 202 about an axis of rotation 206, which is indicated in the Figures by a dotted line and the reference numeral 206. The rotary actuator 204 and the radar antenna 100 are configured to allow the rotary actuator 204 to rotate the radar antenna 100 within the radome 202 about an axis of rotation 206 through 360°. However, in some embodiments, only less than 360° rotation of the antenna 100 is permitted or is possible, for example, in some embodiments, the radar antenna 100 can be rotated through only up to 180°. The rotary actuator 204 and antenna 100 are further configured to provide for movement to a fixed angular position of the radar antenna 100 relative to the radome 202.

In this embodiment, the axis of rotation 206 is substantially coincident with a longitudinal axis of the radome 202 (i.e. a longitudinal axis of the aircraft nose assembly 200), which may, for example, be coincident with a longitudinal or roll axis of an aircraft when the radome 202 is fixed to an aircraft.

Figure 3:
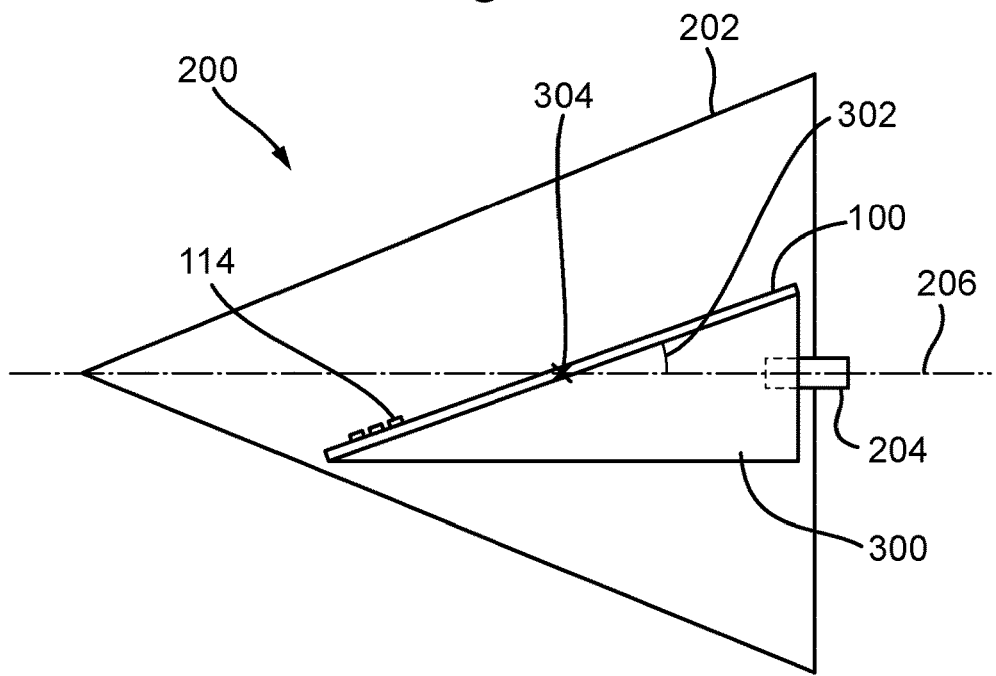
FIG. 3 is a schematic illustration (not to scale) showing a further side view cross section the aircraft nose assembly.

FIG. 3 is a schematic illustration (not to scale) showing a side view cross section of this embodiment of the aircraft nose assembly 200. FIG. 3 shows the radar antenna 100 at a different angular position relative to the radome 202 to that shown in FIG. 2. In particular, compared to its position in FIG. 2, the radar antenna 100 in FIG. 3 has been rotated by 90° about the axis of rotation 206.

In this embodiment, the radar antenna 100 is mounted to a substantially wedge shaped base portion 300. The base portion 300 may be made of a lightweight, strong material such as a carbon or glass fibre composite material. The base portion 300 has a relatively thick rear end to which the second end 104 of the radar antenna is mounted. The base portion 300 tapers to nothing at its forward end to which the first end 102 of the radar antenna 100 is mounted.

The rotary actuator 204 is attached to the rear end of the base portion 300, and is configured to rotate the assembly comprising the base portion 300 and the radar antenna 100 about the axis of rotation 206.

In this embodiment, the transmit and receive surface (i.e. the top surface) of the radar antenna 100 is oblique (i.e. neither parallel nor perpendicular) to the axis of rotation 206. For example, the top surface of the radar antenna 100 may be positioned at an angle of between 20° and 40° (for example, 20°, 25°, 30°, 35°, or 40°) relative to the axis of rotation 206 such that the radar antenna elements 114 are directed both forwards from the radome 202 and to a side of the radome 202. This angle is indicated in FIG. 3 by the reference numeral 302 and in this embodiment, the angle 302 is 25°.

In this embodiment, the axis of rotation 206 passes through the top surface of the radar antenna 100 at a point indicated in FIGS. 2 and 3 by an 'x' and the reference numeral 304. This point 304 is located along the axis of symmetry of the top surface of the radar antenna 100, and is between 30% and 80% (such as 30%, 40%, 50%, 60%, 70%, or 80%), or between 40% and 60%, along the length of the radar antenna 100 from the first end 102. Thus, in this embodiment, the point 304 is between 0.39 m and 1.04 m from the first end 102 in the direction of the second end 104.

Figure 4:
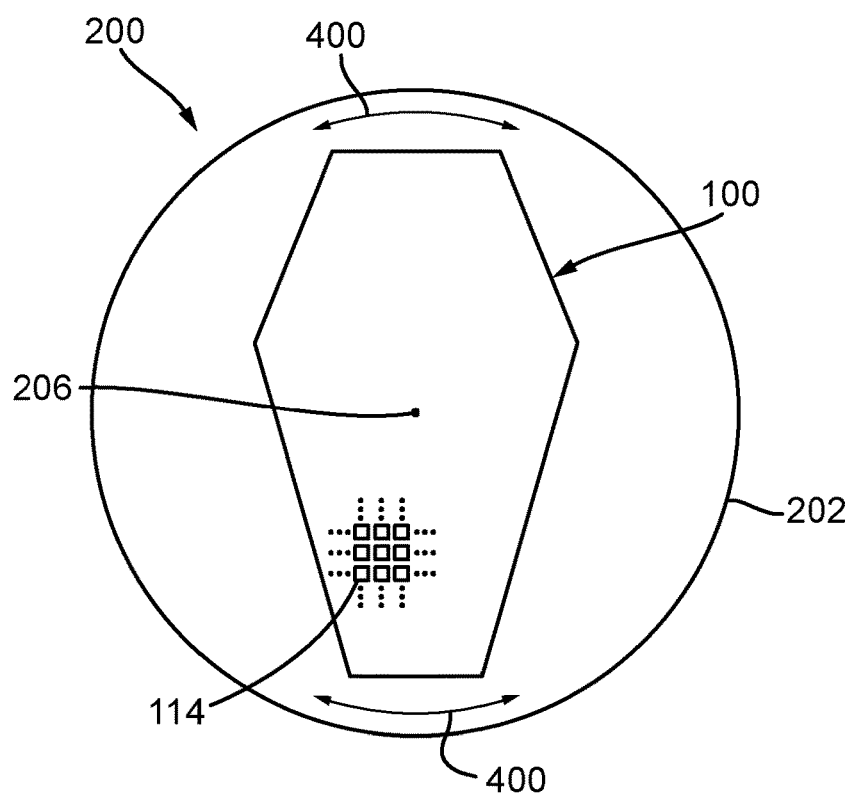
FIG. 4 is a schematic illustration (not to scale) showing a front view cross section the aircraft nose assembly.

FIG. 4 is a schematic illustration (not to scale) showing a front view cross section of the aircraft nose assembly 200. FIG. 4 shows a frontal aspect of the radar antenna 100.

Example rotation of the radar antenna 100 about the axis of rotation is indicated in FIG. 4 by double headed arrows and the reference numeral 400.

In this embodiment, the frontal aspect projected area (i.e. the area of the top surface of the radar antenna 100 when the assembly 200 is viewed from the front, as in FIG. 4) is approximately 0.34 m².

Also, in this embodiment, the maximum side aspect projected area (i.e. the area of the top surface of the radar antenna when the assembly 200 is viewed from the side and the radar antenna 100 is oriented to face that side) is approximately 0.73 m².

Advantageously, the radar antenna 100 being oblique to the axis of rotation 206 (and the longitudinal axis of the radome 202) means that, in operation, radar waves can be transmitted both forward from the aircraft nose assembly 200, and also from the sides of the aircraft nose assembly 200 as the radar antenna 100 is rotated.

Figure 5:
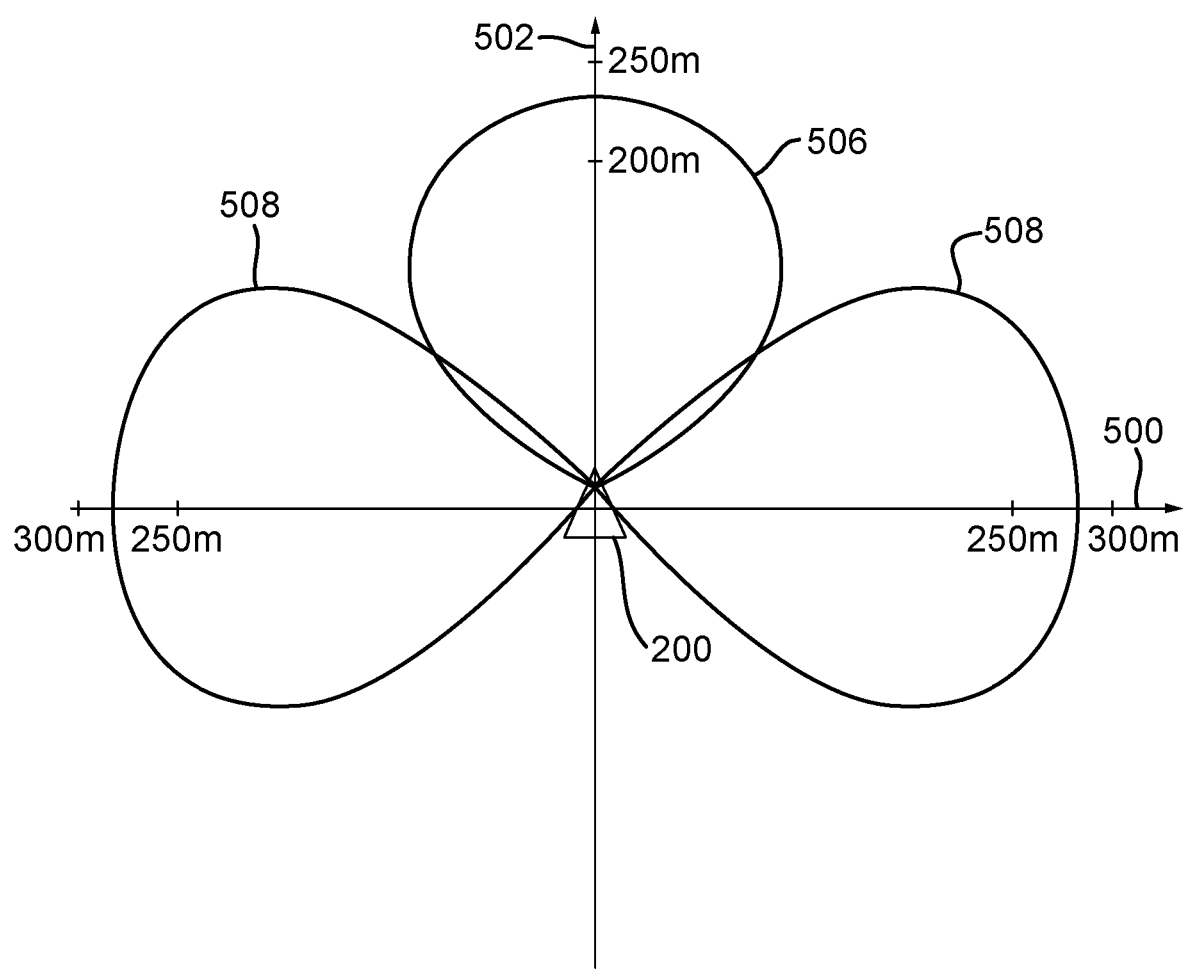
FIG. 5 is a schematic illustration (not to scale) showing the field-of-regard of the aircraft nose assembly.

FIG. 5 is a schematic illustration (not to scale) showing a top down view of the antenna field of regard of the aircraft nose assembly 200.

An x-axis representing a distance perpendicular to the longitudinal axis aircraft nose assembly 200 is indicated in FIG. 5 by the reference numeral 500. A y-axis representing a distance parallel to the longitudinal axis aircraft nose assembly 200 is indicated in FIG. 5 by the reference numeral 502.

In this embodiment, the radar field of regard comprises a forward field of view 506 and a side field of view 508.

In this embodiment, the forward field of view 506 is substantially the same irrespective of the angular position of the radar antenna about the axis of rotation 206 with respect to the radome 202. In this embodiment, the forward field of view 506 is substantially independent of the angle 400 about the axis of rotation 206.

The direction of the side field of view 508 with respect to the radome 202 depends on the angular position of the radar antenna about the axis of rotation 206 with respect to the radome 202. In particular, the side view 508 of radar antenna is directed in the direction that the radar antenna 100 is facing and may be changed by varying the angle 400 (i.e. by rotating the radar antenna 100 about the axis of rotation 206). Although FIG. 5 shows two opposite side field of views 508 simultaneously, it will be appreciated that, in this embodiment, only one such view 508 is achievable at a given time, the achievable side view 508 being in the direction in which the radar antenna 100 is facing.

The forward field of view 506 represents radiation emitted by the radar antenna elements 114 from the aircraft nose assembly 200 in the forward direction, i.e. in the direction of the y-axis 502. The forward field of view 506 represents radar waves transmitted from the frontal aspect of the radar antenna 100 as shown in FIG. 4.

As the radar antenna 100 is rotated about the axis of rotation 206 by the rotary actuator 204, the frontal aspect of the radar antenna 100 sweeps through a circle, with the largest dimension (i.e. a maximum diameter) defined by the second end of the antenna 104. In this embodiment, this maximum diameter is 1.04 m. Surprisingly, the forward facing performance of the radar antenna 100 (i.e. the forward field of view 506) tends to be improved compared to a fixed forward facing radar antenna having an area equal to the forward projected area of the radar antenna 100. This tends to be because the top surface of the radar antenna is relatively large compared to such a forward facing fixed radar antenna. Thus, the top surface of the radar antenna 100 contains a larger number of radar antenna elements 114 than can fit into such a forward facing fixed radar antenna. The increased power output from the increased number of radar antenna elements 114 advantageously tends to provide for improved forward performance compared to a fixed forward facing antenna of similar size.

In this embodiment, the effective range of the radar antenna 100 along the y-axis is between 200 km and 250 km. This tends to be achievable using a transmit power of approximately 12 W per radar antenna element 114, and a total transmit power of approximately 31 kW.

The side fields of view 508 represents radiation emitted by the radar antenna elements 114 from a side of the aircraft nose assembly 200, i.e. in the direction of the x-axis 500. The forward field of view 506 represents radar waves transmitted from the frontal aspect of the radar antenna 100 as shown in FIG. 4.

In this embodiment, the effective range of the radar antenna 100 along the x-axis is between 250 km and 350 km. This tends to be achievable using a transmit power of approximately 12 W per radar antenna element 114, and a total transmit power of approximately 31 kW.

By changing the angle 302 of the radar antenna 100 with respect to the axis of rotation 206, how transmitted radar energy is proportioned between the forward and sideways directions 502, 500 can be varied. Advantageously, the angle 302 being between 20° and 40° (and more preferably 20°) tends to provide good performance of the radar antenna 100 in both forward and sideways directions 502, 500.

Advantageously, the angle 302 being between 20° and 40° tends to provide that there is little or no shadowing of the radar antenna elements 114 by each other.

In the above embodiments, the top surface of the radar antenna is elongate and hexagonal.

However, in other embodiments, the radar antenna has a different shape. For instance in other embodiments the radar antenna could be oval, or ovoid (egg-shaped). Where oval or ovoid antenna are provided, a width of at least a portion of the radar antenna may taper, so as to curve, in a direction of a longitudinal axis of the radar antenna. The width of the radar antenna may taper outwards, so as to curve outwards, in a direction of a longitudinal axis of the radar antenna from a first end of the radar antenna to an intermediate portion of the radar antenna. The width of the radar antenna may taper inwards, so as to curve inwards, in a direction of the longitudinal axis of the radar antenna from the intermediate portion of the radar antenna to a second end of the radar antenna, the second end being opposite to the first end.

In the above embodiments, the top surface of the radar antenna is flat, i.e. planar. However, in other embodiments, the radar antenna is not flat, i.e. non-planar. For example, the radar antenna may have a curved surface.

In the above embodiments, the dimensions of the radar antenna are as described above. However, in other embodiments, one or more of the dimensions of the radar antenna is different to that described above.

In the above embodiments, the radar antenna is configured to both transmit and receive radar waves. However, in other embodiments, the radar antenna is configured to either only transmit radar waves or only receive radar waves.

In the above embodiments, the top surface of the radar antenna is at an angle of between 20° and 40° relative to the axis of rotation. However, in other embodiments, the top surface of the radar antenna is at a different angle (i.e. less than 20° or greater than 40°) to the axis of rotation.

In the above embodiments, the axis of rotation passes through the top surface of the radar antenna at a point that is located along the axis of symmetry of the top surface of the radar antenna, and is between 30% and 80%, or between 40% and 60%, along the length of the radar antenna from the first end. However, in other embodiments, the axis of rotation does not pass through the top surface of the radar antenna at such a point. For example, the axis of rotation may pass through the top surface of the radar antenna at a different point.

The invention claimed is:

1. An aircraft radar assembly comprising:
   a radome;

a radar antenna housed within the radome, the radar antenna having an elongate surface having bilateral symmetry for transmitting and/or receiving radar waves; and rotation means configured to rotate the radar antenna within the radome about a fixed axis of rotation passing through a point along an axis of symmetry of the surface; wherein the surface is oblique to the axis of rotation, a width of at least a portion of the radar antenna tapers in a direction of a longitudinal axis of the radar antenna, and the radar antenna is arranged such that, when rotated, the radar waves are transmitted both forward of and from all sides of the radar assembly.

2. The aircraft radar assembly according to claim 1, wherein the axis of rotation is parallel to the longitudinal axis of the radome.

3. The aircraft radar assembly according to claim 2, wherein the axis of rotation is coincident with the longitudinal axis of the radome.

4. The aircraft radar assembly according to claim 2, wherein the radar antenna is elongate in the direction of the longitudinal axis of the radome.

5. The aircraft radar assembly according to claim 1, wherein the axis of rotation is coincident with the longitudinal axis of the radome.

6. The aircraft radar assembly according to claim 5, wherein the radar antenna is elongate in the direction of the longitudinal axis of the radome.

7. The aircraft radar assembly according to claim 1, wherein the radar antenna is elongate in the direction of the longitudinal axis of the radome.

8. The aircraft radar assembly according to claim 1, wherein the surface is substantially planar.

9. The aircraft radar assembly according to claim 1, wherein the radar antenna comprises a plurality of radar antenna elements disposed on the surface, each radar antenna element being configured to perform at least one of: transmit radar waves, and detect radar waves.

10. The aircraft radar assembly according to claim 1, wherein: a width of the radar antenna tapers outwards in the direction of the longitudinal axis of the radar antenna from a first end of the radar antenna to an intermediate portion of the radar antenna; and the width of the radar antenna tapers inwards in the direction of the longitudinal axis of the radar antenna from the intermediate portion of the radar antenna to a second end of the radar antenna, the second end being opposite to the first end.

11. The aircraft radar assembly according to claim 1, wherein the surface is hexagonal.

12. An aircraft comprising an aircraft radar assembly, the aircraft radar assembly according to claim 1.

13. The aircraft according to claim 12, wherein the aircraft radar assembly is located at a nose of the aircraft.

14. A method comprising:

providing a radome;

locating a radar antenna within the radome, the radar antenna having an elongate surface having bilateral symmetry for transmitting and/or receiving radar waves; and rotating the radar antenna within the radome about a fixed axis of rotation passing through a point along an axis of symmetry of the surface; wherein:

the surface is oblique to the axis of rotation, a width of at least a portion of the radar antenna tapers in a direction of a longitudinal axis of the radar antenna, and the radar antenna is arranged such that, when rotated, the radar waves are transmitted both forward of and from all sides of the radar assembly.

* * * * *